Dec. 31, 1946.  S. BOUSKY  2,413,285
GYRO ROTOR ASSEMBLY
Filed May 8, 1944  2 Sheets-Sheet 1

INVENTOR.
SAMUEL BOUSKY
BY
Frank H. Harmon
ATTORNEY

Dec. 31, 1946.  S. BOUSKY  2,413,285
GYRO ROTOR ASSEMBLY
Filed May 8, 1944  2 Sheets-Sheet 2

INVENTOR.
SAMUEL BOUSKY
BY
ATTORNEY

Patented Dec. 31, 1946

2,413,285

UNITED STATES PATENT OFFICE 2,413,285

GYRO ROTOR ASSEMBLY

Samuel Bousky, Shaker Heights, Ohio, assignor, by mesne assignments, to Jack & Heintz Precision Industries, Inc., Cleveland, Ohio, a corporation of Delaware Application May 8, 1944, Serial No. 534,656

3 Claims. (Cl. 74—5)

This invention relates in general to gyroscopic assemblies and more particularly to the construction thereof and the lubrication system for the moving parts thereof.

One of the primary objects of the invention is to provide a self-lubricating gyro assembly wherein the gyro wheel by its construction and high speed rotation sets up its own lubrication supply and circulation thereof.

Another object of the invention is to provide a gyro wheel and gimbal suspension frame with a casing entirely enclosing the same, which casing is evacuated so as to reduce the power losses due to windage effects and moreover the casing is hermetically sealed to protect the entire assembly from foreign matter and corrosion as the condition of reduced atmosphere within the casing is maintained.

A more specific object of the invention is to provide a gyro rotor and gimbal frame suspension assembly with an evacuated and hermetically sealed container in which a small quantity of liquid lubricant is placed and wherein the high speed spinning of the rotor generates sufficient heat to initially create a sufficient gaseous lubricant vapor to enable the lubricant to be broken up into a mist of finely divided liquid particles by the mechanical disturbance created by the spinning gyro which also creates the impetus for the circulation of the lubricant mist so as to properly bathe and lubricate the bearings of the assembly.

As a matter of mechanical preference the lubricant in this state is circulated from the container to the interior of the gyro wheel hub, through its bearings and back into the hollow axis and thence radially outwardly through the wheel to the container, the gyro wheel, by centrifugal force, thus acting as a self-contained lubricating system and the container as the oil sump.

Figure 1:
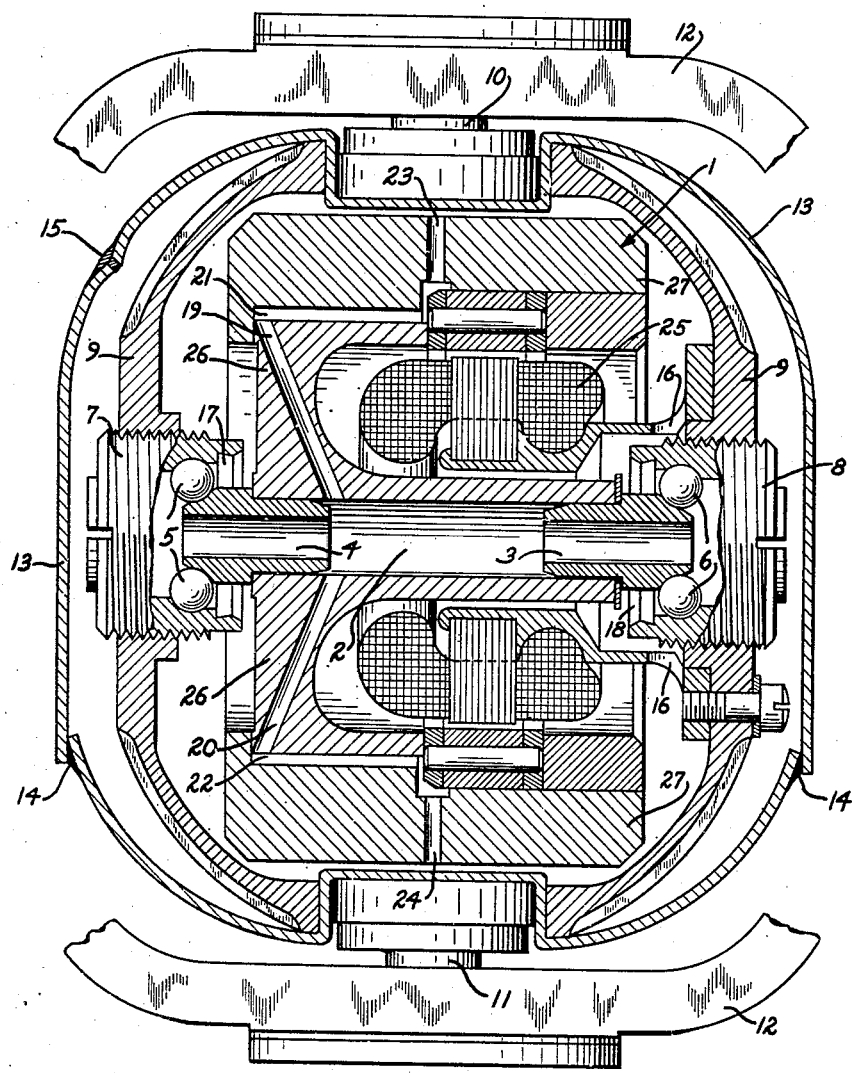
Figure 2:
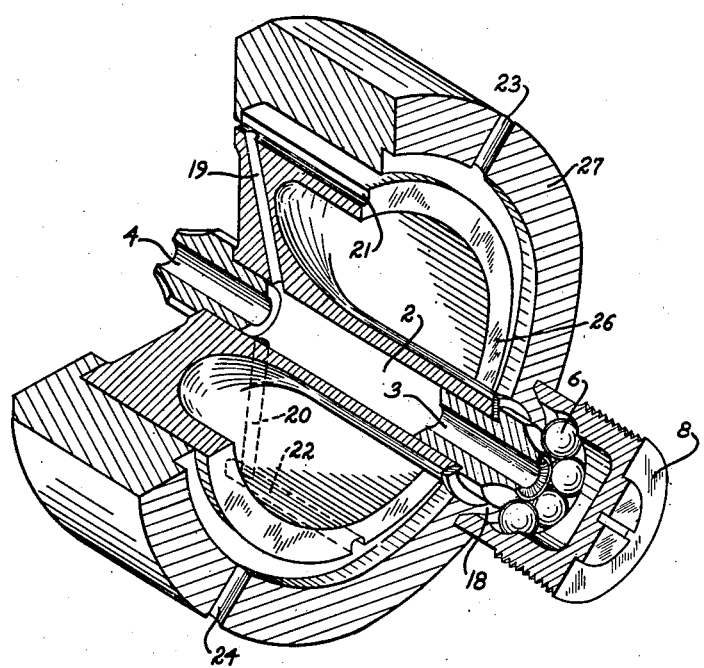

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in section taken through the improved gyro and its gimbal suspension providing two degrees of freedom as well as its container, and Figure 2 is a view in perspective, partly in section of the gyro wheel showing one of its pivots and bearings therefor and also showing the oil passages of the lubricating system.

Referring more particularly to the drawings, the gyro rotor 1 has a hollow hub 2 to receive two hollow end pivots 3 and 4 supported for rotation in ball bearings 5 and 6 in screw threadedly adjustable bearing retainers 7 and 8 in a gimbal frame 9. The gimbal frame is provided with suitable trunnions 10 and 11 supported in suitable bearings carried by a stationary support 12.

The gyro wheel and its gimbal support 9 are enclosed in a casing 13 which may be made in two parts and welded, brazed or soldered together at 14. A predetermined small amount of high grade liquid lubricating oil is dropped into the casing. The container is subsequently evacuated and hermetically sealed by a suitable sealing means 15. The gyro wheel is spun by a suitable electrical motor 25 preferably at a high speed of approximately 24,000 revolutions per minute. The heat generated by the spinning of the gyro wheel initially causes a small quantity of oil in the container to become vaporized at a relatively low temperature in the evacuated container. The mechanical disturbance created by the high speed rotation of the gyro wheel causes the remainder of the oil to be broken up into a mist of finely divided liquid particles readily in the presence of the oil vapor. The details of the motor, its contacts, the electric pick-offs, and the hermetically sealed container and the evacuation thereof are not shown nor described herein in detail as they form no part of the oil mist lubrication system and will form the subject matter of separate applications for patent. As stated before, the rotor, its hollow hub and pivots and bearing retainers are provided with passages establishing communication between the hollow hub and the container. The oil mist, generated in the casing, is drawn in through opening 16 and thence through openings 17 and 18, past the ball bearings 5 and 6 into the hollow bearing retainers 7 and 8. The vapor is then drawn inwardly through the bores of the hollow pivots 3 and 4 into the bore of the hollow hub 2. From there the oil mist is drawn outwardly, by the centrifugal force of the spinning rotor, through passages 19 and 20 into annular passages 21 and 22 and out through radial passages 23 and 24 into the contanier 13 where it is free to again be drawn into passages 16, 17 and 18 into the interior of the hollow hub 2, as just explained. The gyro rotor, hereinbefore generally referred to as rotor 1 is in reality preferably composed of an inner hub 26 of light weight metal on which is press fitted a metal rim 27 of high specific gravity in order to concentrate the weight at the periphery of the rotor.

The fact that the casing 13 is evacuated enables the oil to be readily broken up into a mist of minute particles at relatively low temperatures and a minimum amount of oil to be used so that the oil mist generated in the casing will readily and completely circulate by the centrifugal force set up by the spinning rotor without any impedance of air in the contianer. The spinning gyro rotor, by reason of the evacuated container and the particular design, arrangement and construction of its passages for completely bathing the bearings in the oil mist, constitutes in itself a self-lubricating gyro assembly in that by the rotation of the gyro wheel the oil is changed into a mist and a centrifugal force is set up which acts as a suction system for positive pressure oil mist lubrication.

I claim:

1. In a gyro assembly including a high speed gyro rotor having a hollow axle, a bearing carrying suspension means for said axle, a self-contained evacuated sealed casing enclosing said rotor and suspension means and having a relatively small quantity of liquid lubricant therein, intake passages from said casing for lubricant past said bearings and coaxially with said axle and outlet passages from said axle extending alternately radially and axially into said casing, said gyro wheel upon rapid rotation being adapted to generate sufficient heat to vaporize a portion of said liquid in the vacuum in said casing and break up the lubricant into a mist of finely divided liquid particles and create a centrifugal force sufficient to constitute in itself a suction system to draw said lubricant mist from the casing as a sump, coaxially about the axle bearings and radially outwardly through the rotor into the casing.

2. In a gyro assembly including a high speed gyro rotor having a hollow axle, a bearing carrying suspension means for the axle thereof, a self-contained lubricant containing casing enclosing said rotor and suspension means, intake passages from said casing for lubricant past said bearings and coaxially with said axle and outlet passages from said axle extending alternately radially and axially into said casing, said gyro wheel upon rapid rotation being adapted to generate sufficient heat to vaporize a portion of said lubricant and break up the lubricant into a mist of finely divided liquid particles and create a centrifugal force sufficient to constitute a suction system to draw said lubricant mist from the casing as a sump, coaxially about the axle bearings and radially outwardly through the rotor into the casing.

3. In a gyro assembly including a high speed gyro rotor having an axle, a bearing carrying suspension means for said axle, a self-contained evacuated sealed casing enclosing said rotor and suspension means and having a relatively small quantity of liquid lubricant therein, intake passages from said casing for lubricant past said bearings and coaxially with said axle and outlet passages from said axle extending alternately radially and axially into said casing, said gyro wheel upon rapid rotation being adapted to generate sufficient heat to vaporize a portion of said liquid in the vacuum in said casing and break up the lubricant into a mist of finely divided liquid particles and create a centrifugal force sufficient to constitute in itself a suction system to draw said lubricant mist from the casing as a sump, coaxially about the axle bearings and radially outwardly through the rotor into the casing.

SAMUEL BOUSKY.